US 8,472,374 B2

(12) United States Patent
Baldemair et al.

(10) Patent No.: US 8,472,374 B2
(45) Date of Patent: Jun. 25, 2013

(54) DISTINGUISHING BETWEEN SYNCHRONIZED AND ASYNCHRONOUS MOBILE COMMUNICATIONS NETWORKS

(75) Inventors: Robert Baldemair, Solna (SE); Muhammad Ali Kazmi, Bromma (SE); Bengt Lindoff, Bjärred (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1250 days.

(21) Appl. No.: 12/140,990

(22) Filed: Jun. 17, 2008

(65) Prior Publication Data
US 2009/0117896 A1 May 7, 2009

Related U.S. Application Data (60) Provisional application No. 60/986,140, filed on Nov. 7, 2007.

(51) Int. Cl.
*H04W 4/00* (2009.01)
*H04J 3/06* (2006.01)

(52) U.S. Cl.
USPC ......... 370/328; 370/350; 370/509; 455/422.1

(58) Field of Classification Search
USPC .............. 370/331, 350; 455/434, 502, 422.1
See application file for complete search history.

(56) References Cited

U.S. PATENT DOCUMENTS

| | | | | |
|---|---|---|---|---|
| 6,847,630 B2 * | 1/2005 | Blanz et al. | | 370/350 |
| 6,865,177 B1 * | 3/2005 | Park et al. | | 370/350 |
| 6,888,456 B2 * | 5/2005 | Cheng et al. | | 340/539.21 |
| 6,952,583 B1 * | 10/2005 | Park et al. | | 455/434 |
| 7,324,479 B2 | 1/2008 | Hur | | |
| 7,623,586 B2 * | 11/2009 | Miyashita et al. | | 375/262 |
| 7,848,754 B2 * | 12/2010 | Kim et al. | | 455/436 |
| 2001/0006515 A1 | 7/2001 | Lee et al. | | |

(Continued)

FOREIGN PATENT DOCUMENTS

| | | |
|---|---|---|
| CN | 1541011 | 10/2004 |
| CN | 1558691 | 12/2004 |

(Continued)

OTHER PUBLICATIONS

PCT International Search Report, dated Jul. 14, 2009, in connection with International Application No. PCT/EP2008/064978.

(Continued)

*Primary Examiner* — Faruk Hamza
*Assistant Examiner* — Cassandra Decker
(74) *Attorney, Agent, or Firm* — Potomac Patent Group PLLC (57) ABSTRACT

A user equipment is operated in a mobile communications system, wherein a network part of the mobile communications system is capable of operating in a synchronized mode or in an asynchronous mode. Operation includes recording timing information about a periodically occurring signal received from a neighboring cell. The recorded timing information is used in a blind detection process that ascertains whether the network part of the mobile communications system is operating in the synchronized mode or in the asynchronous mode by detecting at least whether the periodically occurring signal received from the neighboring cell occurred within a predetermined window of time of a corresponding periodically occurring signal received from a serving cell. The detected operating mode of the network part of the mobile communications system is used for controlling subsequent operation of the user equipment.

16 Claims, 10 Drawing Sheets

U.S. PATENT DOCUMENTS

| | | | |
|---|---|---|---|
| 2002/0071404 A1* | 6/2002 | Park et al. | 370/331 |
| 2003/0007470 A1* | 1/2003 | Grilli et al. | 370/335 |
| 2005/0013279 A1* | 1/2005 | Hwang et al. | 370/343 |
| 2005/0043046 A1* | 2/2005 | Lee | 455/502 |
| 2006/0270406 A1* | 11/2006 | Kim | 455/436 |
| 2007/0104178 A1* | 5/2007 | Park et al. | 370/350 |
| 2007/0258405 A1* | 11/2007 | Kim et al. | 370/331 |
| 2007/0259667 A1* | 11/2007 | Kim et al. | 455/440 |
| 2007/0280160 A1* | 12/2007 | Kim et al. | 370/331 |
| 2008/0037470 A1* | 2/2008 | Kim et al. | 370/331 |
| 2008/0144580 A1* | 6/2008 | Su et al. | 370/332 |
| 2008/0242304 A1* | 10/2008 | Ju et al. | 455/439 |
| 2009/0034589 A1* | 2/2009 | Hahm et al. | 375/150 |
| 2009/0036083 A1* | 2/2009 | Darwood | 455/296 |
| 2009/0190549 A1* | 7/2009 | Kim et al. | 370/331 |

FOREIGN PATENT DOCUMENTS

| | | |
|---|---|---|
| EP | 1 102 506 A | 5/2001 |
| EP | 1 213 941 A | 6/2002 |
| WO | 2005/001605 A2 | 1/2005 |
| WO | 2006/073212 A | 7/2006 |

OTHER PUBLICATIONS

PCT Written Opinion, dated Jul. 14, 2009, in connection with International Application No. PCT/EP2008/064978.

3GPP TSG-RAN WG4 (Radio) Meeting #45 "Revised Version: Intra-Frequency Cell Identification Performance Results", Korea, Jeju, Nov. 5-9, 2007, R4-072131.

3GPP Technical Specification TS 36.201 V8.1.0 Technical Specification Group Radio Access Network; Evolved Universal Terrestrial Radio Access (E-UTRA); LTE Physical Layer—General Description (Release 8), Nov. 2007.

PCT International Preliminary Report on Patentability, mailed May 20, 2010, in connection with International Application No. PCT/EP2008/064978.

* cited by examiner

DISTINGUISHING BETWEEN SYNCHRONIZED AND ASYNCHRONOUS MOBILE COMMUNICATIONS NETWORKS

CROSS REFERENCE TO RELATED APPLICATIONS

This application claims the benefit of U.S. Provisional Application No. 60/986,140, filed Nov. 7, 2007, which is hereby incorporated herein by reference in its entirety.

BACKGROUND

The present invention relates to cellular telecommunications, and more particularly to methods and apparatuses that enable a user equipment (UE) in a cellular telecommunications system to distinguish between synchronized and unsynchronized network operation and additionally to adapt its operation accordingly.

The forthcoming Evolved-Universal Terrestrial Radio Access Network (E-UTRAN) Long Term Evolution (LTE) technology, as defined by 3GPP TR 36.201, "Evolved Universal Terrestrial Radio Access (E-UTRA); Long Term Evolution (LTE) physical layer; General description" will be able to operate over a very wide span of operating bandwidths and also carrier frequencies. Furthermore E-UTRAN systems will be capable of operating within a large range of distances, from microcells (i.e., cells served by low power base stations that cover a limited area, such as a shopping center or other building accessible to the public) up to macrocells having a range that extends up to 100 km. In order to handle the different radio conditions that may occur in the different applications, Orthogonal Frequency Division Multiple Access (OFDMA) technology is used in the downlink (i.e., the communications link from the base station to UE) because it is a radio access technology that can adapt very well to different propagation conditions. In OFDMA, the available data stream is portioned out into a number of narrowband subcarriers that are transmitted in parallel. Because each subcarrier is narrowband it only experiences flat-fading. This makes it very easy to demodulate each subcarrier at the receiver.

Furthermore LTE technology operates in both synchronized and asynchronous networks. In a synchronized network, all of the base stations (e.g., eNodeBs) use the same timing over the air interface, whereas in an asynchronous network, a base station's air interface timing could differ from its neighbor's. The radio channel properties and characteristics of the received signals vary, depending on whether the network is synchronized or not. To take one example, in the case of synchronized networks, the estimated channel in the downlink is typically a multi-channel estimate of all contributing radio base stations. The channel estimate is degraded because the reference signals collide with one another. By contrast, in an asynchronous network the reference signals collide with data rather than with other cells' reference signals, thereby giving a more random behavior that can be treated as noise.

To take another example, the characteristics of the received signal will also differ, depending on whether the network is synchronized or unsynchronized. One example is the synchronization channel, whose signals enable a UE to synchronize its own operation with that of its serving cell: Even though different synchronization signals are used in the different cells, their occurrence in time will coincide in a synchronized network, whereas this is much less likely in an asynchronous network. Therefore, a receiver optimized for use in a synchronized network will not treat another base station's synchronization signals as interference, but rather as a competing synchronization signal.

These two examples show that it is beneficial for the receiver to know whether it is operating in a synchronized or asynchronous network.

Conventional UEs do not detect the synchronization state of a network. Consequently, the UE's algorithms and procedures must be designed to operate satisfactorily in both synchronized and asynchronous networks. This compromise results in sub-optimal performance in both cases. If the UE knew the synchronization state of the network in which it was operating, it would be able to perform the best algorithms (e.g., cell search and channel estimation) under the circumstances.

It is therefore desirable to provide a mechanism that enables a UE to determine whether the network in which it is operating is synchronized or not in order to allow it to select best suited algorithms/procedures for subsequent operations.

SUMMARY

It should be emphasized that the terms "comprises" and "comprising", when used in this specification, are taken to specify the presence of stated features, integers, steps or components; but the use of these terms does not preclude the presence or addition of one or more other features, integers, steps, components or groups thereof.

In accordance with one aspect of the present invention, the foregoing and other objects are achieved in methods and apparatuses that operate a user equipment in a mobile communications system, wherein a network part of the mobile communications system is capable of operating in a synchronized mode or in an asynchronous mode. Such operation includes recording timing information about a periodically occurring signal received from a neighboring cell. The recorded timing information is used in a blind detection process that ascertains whether the network part of the mobile communications system is operating in the synchronized mode or in the asynchronous mode by detecting at least whether the periodically occurring signal received from the neighboring cell occurred within a predetermined window of time of a corresponding periodically occurring signal received from a serving cell. The detected operating mode of the network part of the mobile communications system is used for controlling subsequent operation of the user equipment.

In some embodiments, using the detected operating mode of the network part of the mobile communications system for controlling subsequent operation of the user equipment comprises performing a function using a first process if the detected operating mode of the network part of the mobile communications system is the synchronized mode, wherein the first process is optimized for use in a mobile communication system that is operating in the synchronized mode. The function is performed using a second process if the detected operating mode of the network part of the mobile communications system is the asynchronous mode, wherein the second process is optimized for use in a mobile communication system that is operating in the asynchronous mode.

In some of these embodiments, the function is a cell search function. In some alternative embodiments, the function is a channel estimation function.

In another aspect of some embodiments, operation of the user equipment includes performing an initial cell search function that is optimized for use in a mobile communication system that is operating in the synchronized mode if an earlier network synchronization status decision indicates that the user equipment had earlier been operating in a mobile communication system that was operating in the synchronized mode. An initial cell search function that is optimized for use in a mobile communication system that is operating in the asynchronous mode is performed if the earlier network synchronization status decision indicates that the user equipment had earlier been operating in a mobile communication system that was operating in the asynchronous mode.

In some of these embodiments, operation includes initially determining whether the earlier network synchronization status decision is reliable enough to be used.

In another aspect, operation of the user equipment includes preventing the blind detection process that ascertains whether the network part of the mobile communications system is operating in the synchronized mode or in the asynchronous mode from relying on timing information about a periodically occurring signal received from a neighboring cell that is served by a base station that also serves the serving cell.

In some of these embodiments, operation includes detecting whether the neighboring cell is served by a base station that also serves the serving cell by comparing a cell identifier of the neighboring cell with a cell identifier of the serving cell.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with reference to the figures, in which like parts are identified with the same reference characters.

The various aspects of the invention will now be described in greater detail in connection with a number of exemplary embodiments. To facilitate an understanding of the invention, many aspects of the invention are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions being executed by one or more processors, or by a combination of both. Moreover, the invention can additionally be considered to be embodied entirely within any form of computer readable carrier, such as solid-state memory, magnetic disk, or optical disk containing an appropriate set of computer instructions that would cause a processor to carry out the techniques described herein. Thus, the various aspects of the invention may be embodied in many different forms, and all such forms are contemplated to be within the scope of the invention. For each of the various aspects of the invention, any such form of embodiments may be referred to herein as "logic configured to" perform a described action, or alternatively as "logic that" performs a described action.

In an aspect of embodiments consistent with the invention, a UE records the timing occurrence of periodic signals from neighboring cells. This can typically be done during measurements of neighbor cells. Signals used for this purpose are typically synchronization signals and reference signals from neighbouring cells. Then, the UE analyzes the recorded information to determine the synchronization state of the network in which it is operating. This analysis can be considered a blind detection process because the UE is operating without knowledge obtained from signaling.

In another aspect of embodiments consistent with the invention, the UE uses the detected network synchronization state as a basis for choosing which algorithms to use in order to optimize subsequent operation. Examples of algorithms that benefit from this knowledge are detection of neighbor cells (i.e., cell search) and channel estimation.

These and other aspects are described in detail in the following. To facilitate the discussion, LTE terminology is used in this description. However, the use of LTE terminology is not intended to imply that the various inventive concepts are applicable to only the LTE system. To the contrary, the various aspects of the invention can be embodied in any cellular communications system that is capable of operating in either of two modes (i.e., synchronized or asynchronous) and which includes, within its downlink air interface, the transmission of period signals.

Figure 1:
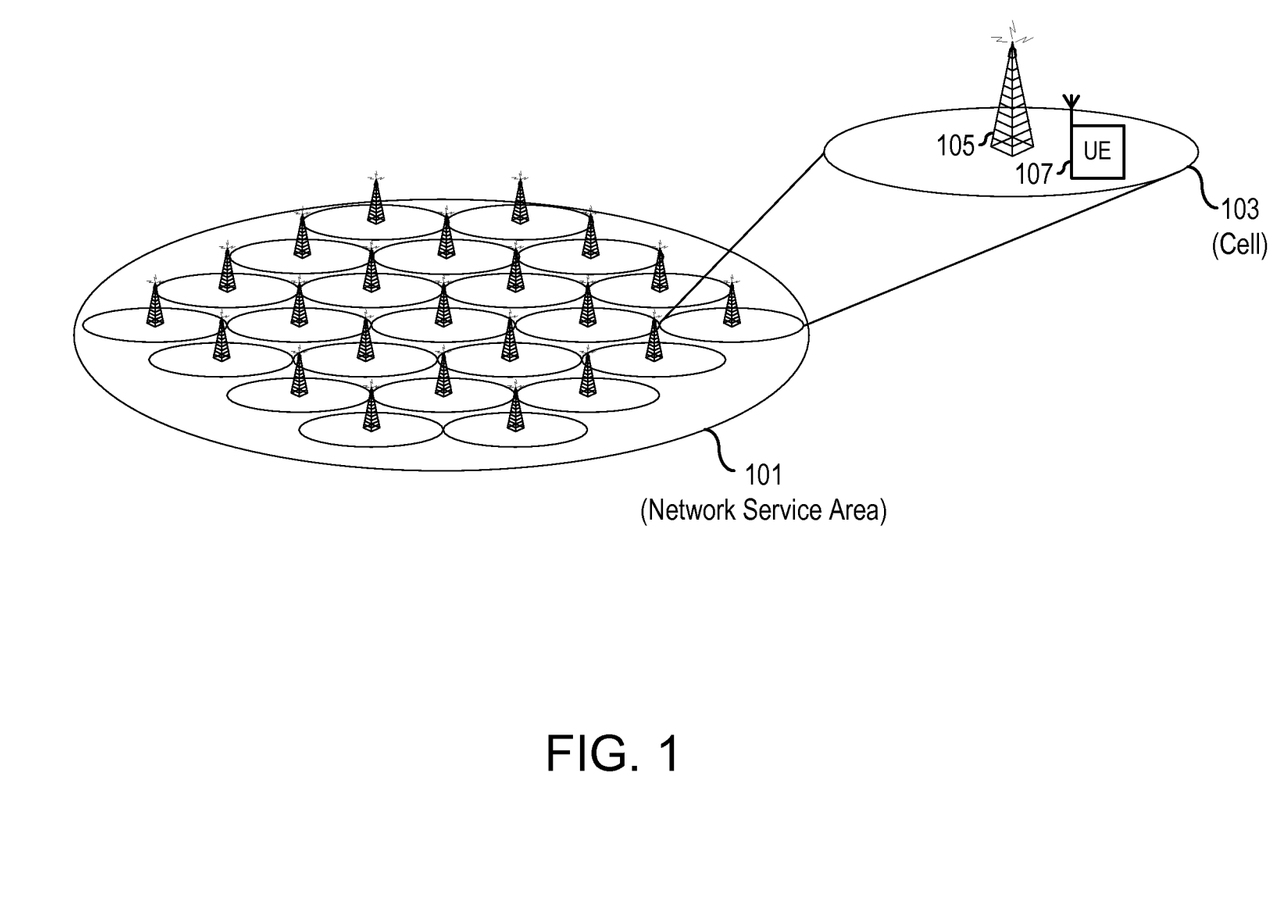
FIG. 1 illustrates a cellular communications system that covers a network service area that comprises a number of cells.

FIG. 1 illustrates a cellular communications system that covers a network service area 101. This service area comprises a number of cells, of which the cell 103 is but one example. The cell 103 is defined by its radio coverage, which is provided by a radio base station 105 (e.g., eNodeB). One or more UEs, such as the UE 107, that are within range of the radio base station 105 are served by that base station 105.

Figure 2:
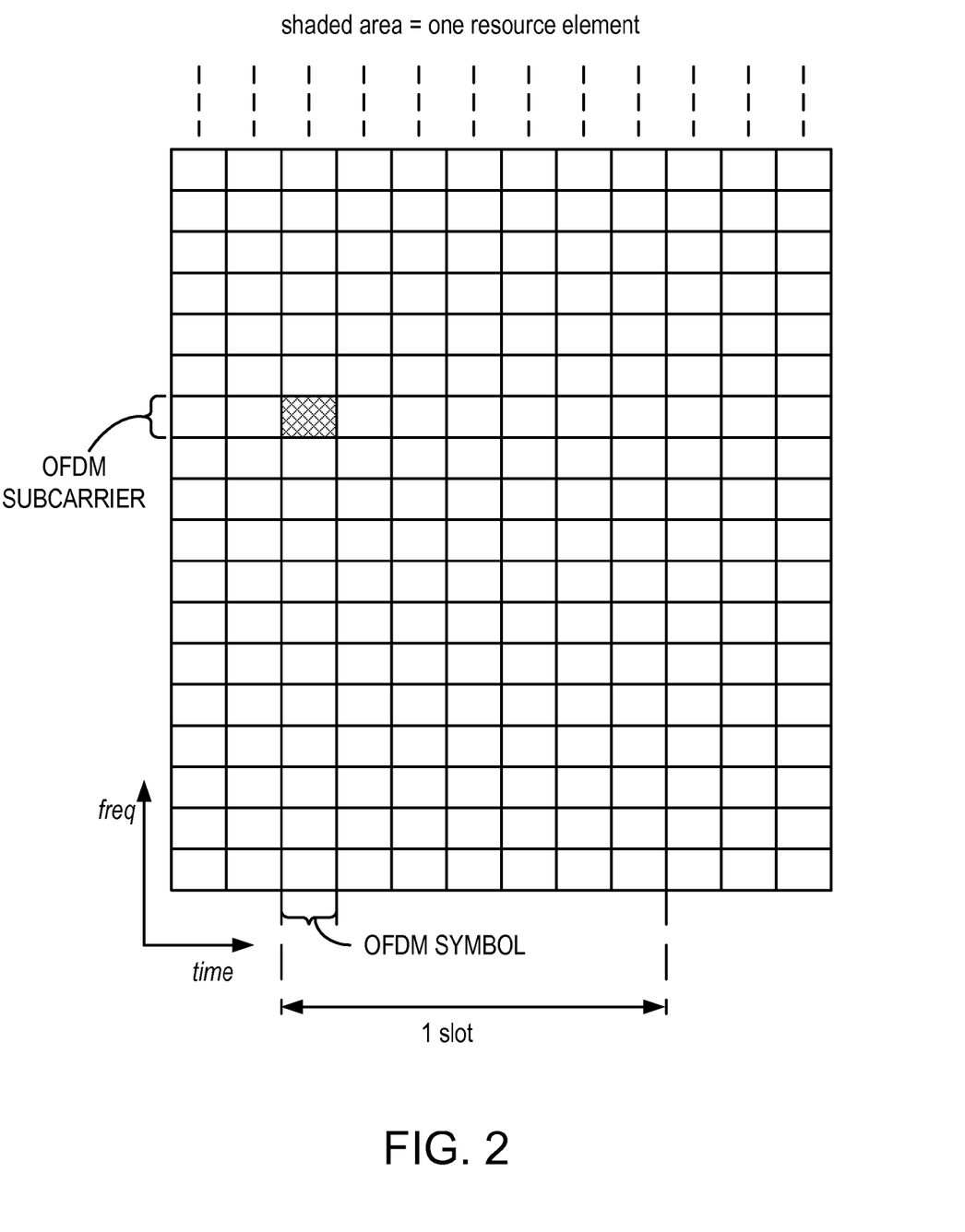
FIG. 2 illustrates a time-frequency grid an exemplary LTE downlink physical resource ("resource element") that corresponds to one OFDM subcarrier during one OFDM symbol interval.

The LTE physical layer downlink transmission is based on OFDM. The basic LTE downlink physical resource can thus be seen as a time-frequency grid as illustrated in FIG. 2, in which each so-called "resource element" corresponds to one OFDM subcarrier during one OFDM symbol interval.

Figure 3:
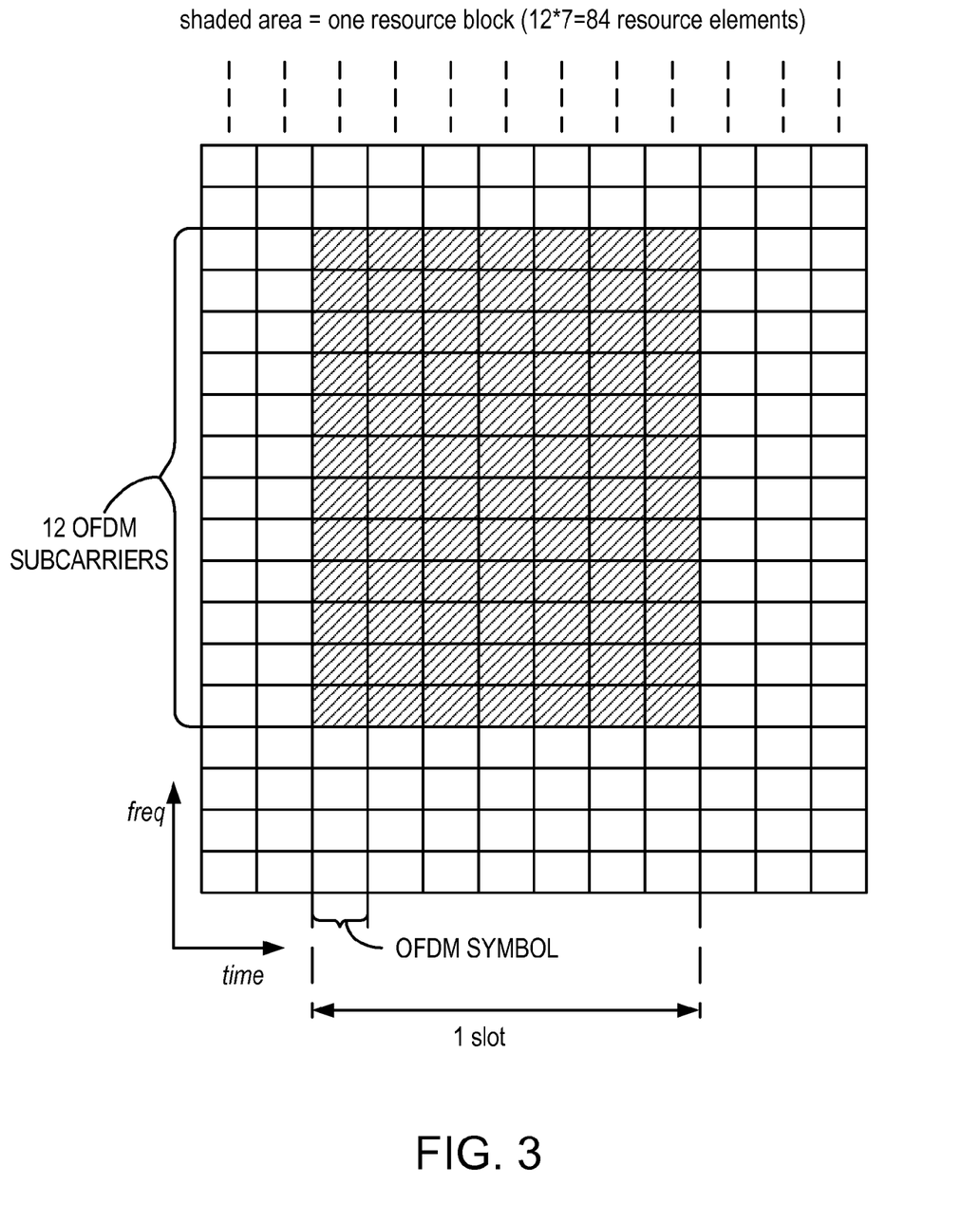
FIG. 3 is a time-frequency grid illustrating how downlink subcarriers in the frequency domain are grouped into resource blocks.

As illustrated in FIG. 3, the downlink subcarriers in the frequency domain are grouped into resource blocks, where each resource block consists of twelve subcarriers for a duration of one 0.5 ms slot (7 OFDM symbols when normal cyclic prefixes are used (as illustrated) or 6 OFDM symbols when extended cyclic prefixes are used), corresponding to a nominal resource-block bandwidth of 180 kHz.

The total number of downlink subcarriers, including a DC-subcarrier, thus equals $N_c = 12 \cdot N_{RB} + 1$ where $N_{RB}$ is the maximum number of resource blocks that can be formed from the 12·$N_{RB}$ usable subcarriers. The LTE physical-layer specification actually allows for a downlink carrier to consist of any number of resource blocks, ranging from $N_{RB-min}$=6 and upwards, corresponding to a nominal transmission bandwidth ranging from 1.4 MHz up to 20 MHz. This allows for a very high degree of LTE bandwidth/spectrum flexibility, at least from a physical-layer-specification point-of-view.

Figure 4A:
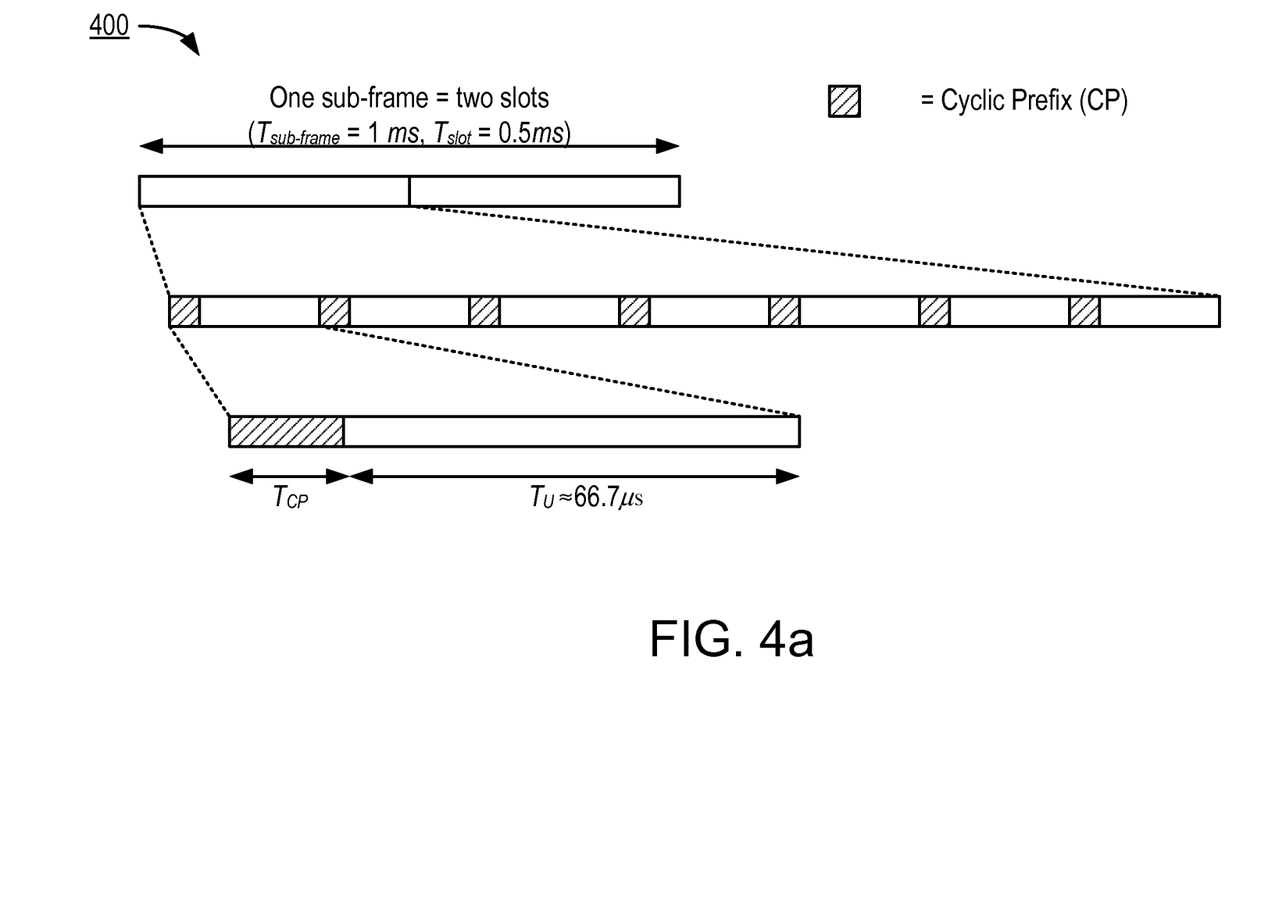
FIG. 4a illustrates a so-called "normal" cyclic prefix length, which allows seven OFDM symbols per slot to be communicated.
Figure 4B:
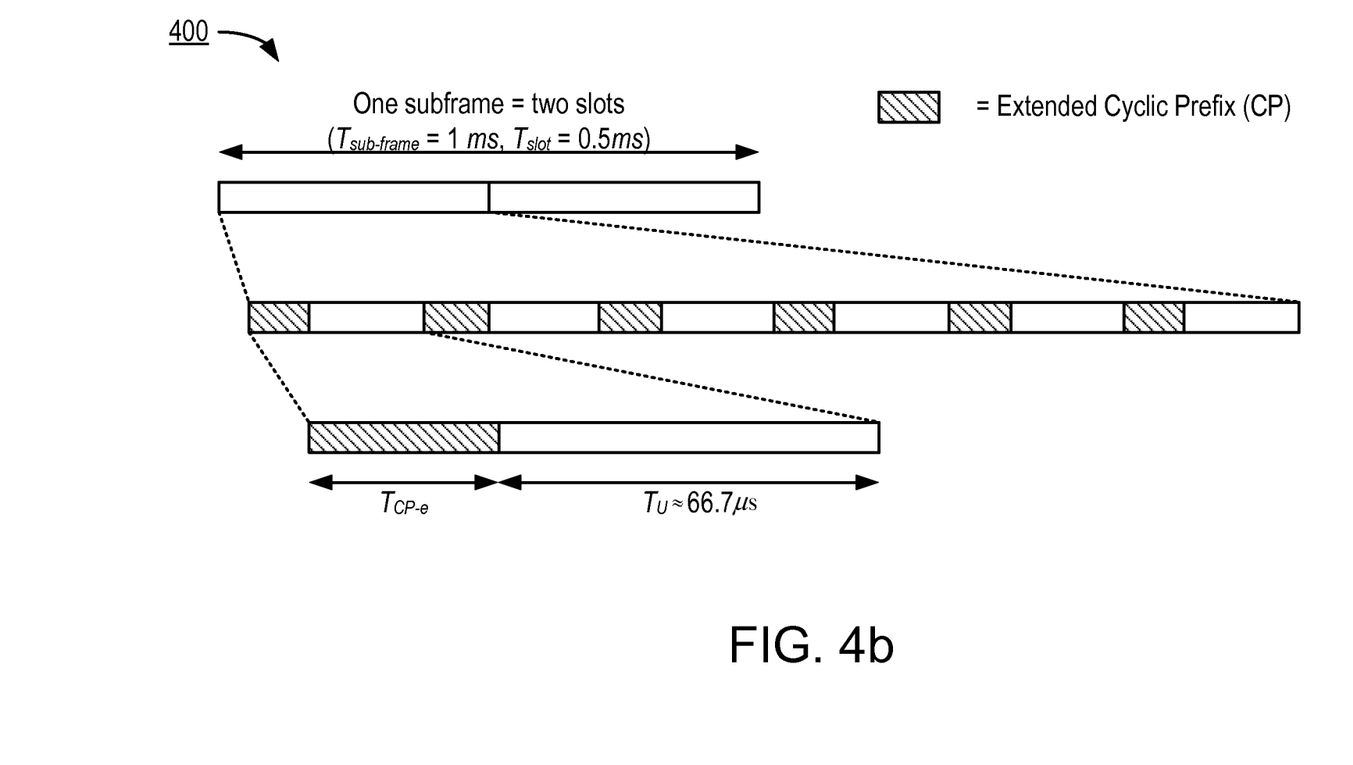
FIG. 4b illustrates an extended cyclic prefix, which because of its longer size, allows only six OFDM symbols per slot to be communicated.

FIGS. 4a and 4b illustrate the time-domain structure for LTE downlink transmission. Each 1 ms subframe 400 consists of two slots of length $T_{slot}$=0.5 ms (=15360·$T_S$, wherein each slot comprises 15,360 time units, $T_S$). Each slot then consists of a number of OFDM symbols.

A subcarrier spacing Δf=15 kHz corresponds to a useful symbol time $T_u$=1/Δf≈66.7 μs (2048·$T_S$). The overall OFDM symbol time is then the sum of the useful symbol time and the cyclic prefix length $T_{CP}$. Two cyclic prefix lengths are defined. FIG. 4a illustrates a normal cyclic prefix length, which allows seven OFDM symbols per slot to be communicated. The length of a normal cyclic prefix, $T_{CP}$, is 160·$T_S$≈5.1 μs for the first OFDM symbol of the slot, and 144·$T_S$≈4.7 μs for the remaining OFDM symbols.

FIG. 4b illustrates an extended cyclic prefix, which because of its longer size, allows only six OFDM symbols per slot to be communicated. The length of an extended cyclic prefix, $T_{CP-e}$, is 512·$T_S$≈16.7 μs.

It will be observed that, in the case of the normal cyclic prefix, the cyclic prefix length for the first OFDM symbol of a slot is somewhat larger than those for the remaining OFDM symbols. The reason for this is simply to fill out the entire 0.5 ms slot, as the number of time units per slot, $T_S$, (15360) is not evenly divisible by seven.

When the downlink time-domain structure of a resource block is taken into account (i.e., the use of 12 subcarriers during a 0.5 ms slot), it will be seen that each resource block consists of 12·7=84 resource elements for the case of normal cyclic prefix (illustrated in FIG. 3), and 12·6=72 resource elements for the case of the extended cyclic prefix (not shown).

Another important aspect of a terminal's operation is mobility, which includes cell search, synchronization, and signal power measurement procedures. Cell search is the procedure by which the terminal finds a cell to which it can potentially connect. As part of the cell search procedure, the terminal obtains the identity of the cell and estimates the frame timing of the identified cell. The cell search procedure also provides estimates of parameters essential for reception of system information on the broadcast channel, containing the remaining parameters required for accessing the system.

To avoid complicated cell planning, the number of physical layer cell identities should be sufficiently large. For example, systems in accordance with the LTE standards support 504 different cell identities. These 504 different cell identities are divided into 168 groups of three identities each.

Figure 5:
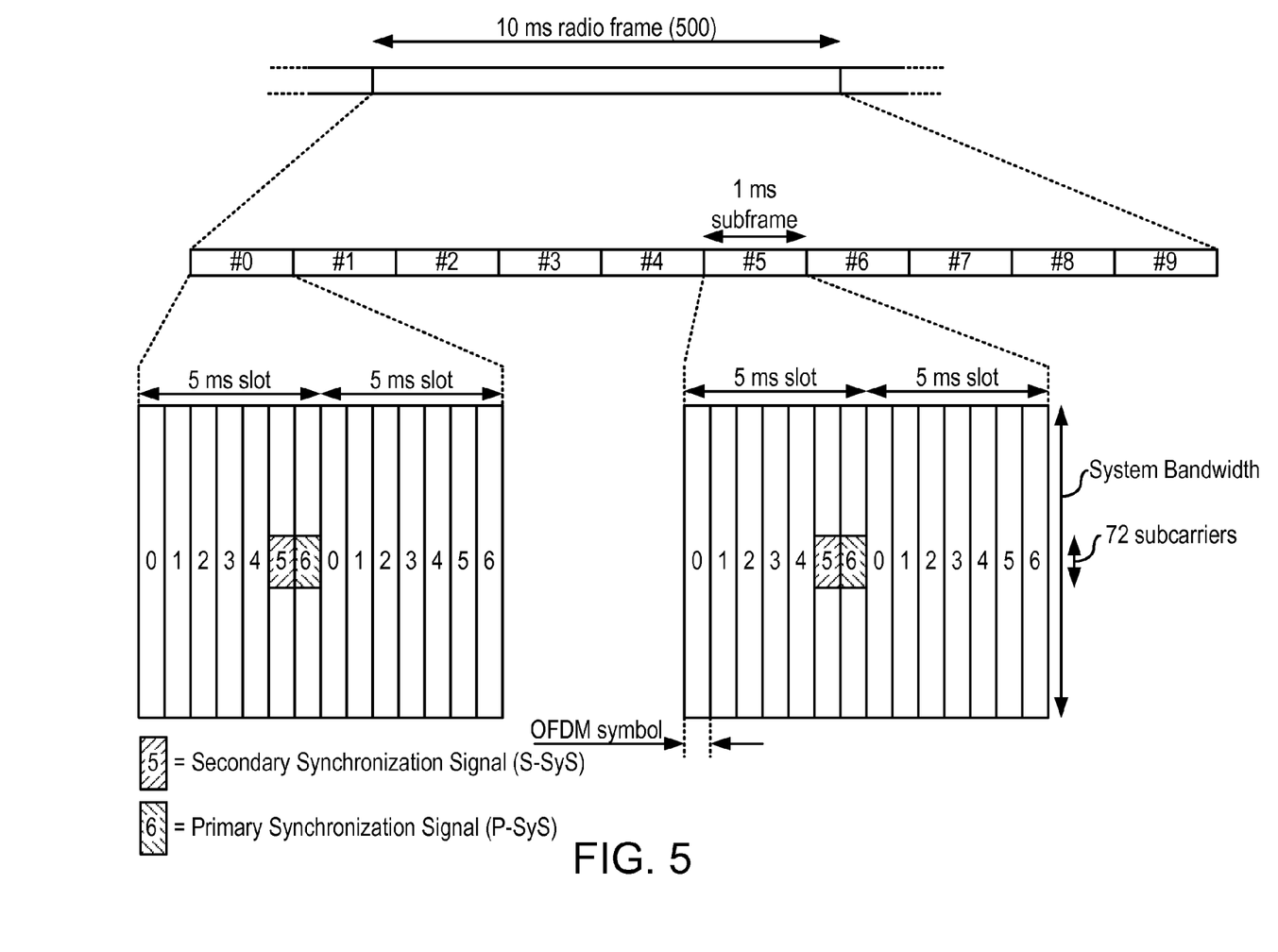
FIG. 5 illustrates the structure of the radio interface of an LTE system.

In order to reduce the cell-search complexity, cell search for LTE is typically done in several steps that make up a process that is similar to the three-step cell-search procedure of the known Wideband Code Division Multiple Access (WCDMA) system. To assist the terminal in this procedure, LTE provides a primary synchronization signal and a secondary synchronization signal on the downlink. This is illustrated in FIG. 5, which shows the structure of the radio interface of an LTE system. The physical layer of an LTE system includes a generic radio frame 500 having a duration of 10 ms. FIG. 5 illustrates one such frame 500 for an LTE Frequency Division Duplex (FDD) system. Each frame has 20 slots (numbered 0 through 19), each slot having a duration of 0.5 ms which normally consists of seven OFDM symbols. A subframe is made up of two adjacent slots, and therefore has a duration of 1 ms, normally consisting of 14 OFDM symbols. The primary and secondary synchronization signals are specific sequences, inserted into the last two OFDM symbols in the first slot of each of subframes 0 and 5. The primary synchronization signal can occupy less bandwidth than does the secondary synchronization signal. In addition to the synchronization signals, part of the operation of the cell search procedure also exploits reference signals that are transmitted at known locations in the transmitted signal.

Figure 6:
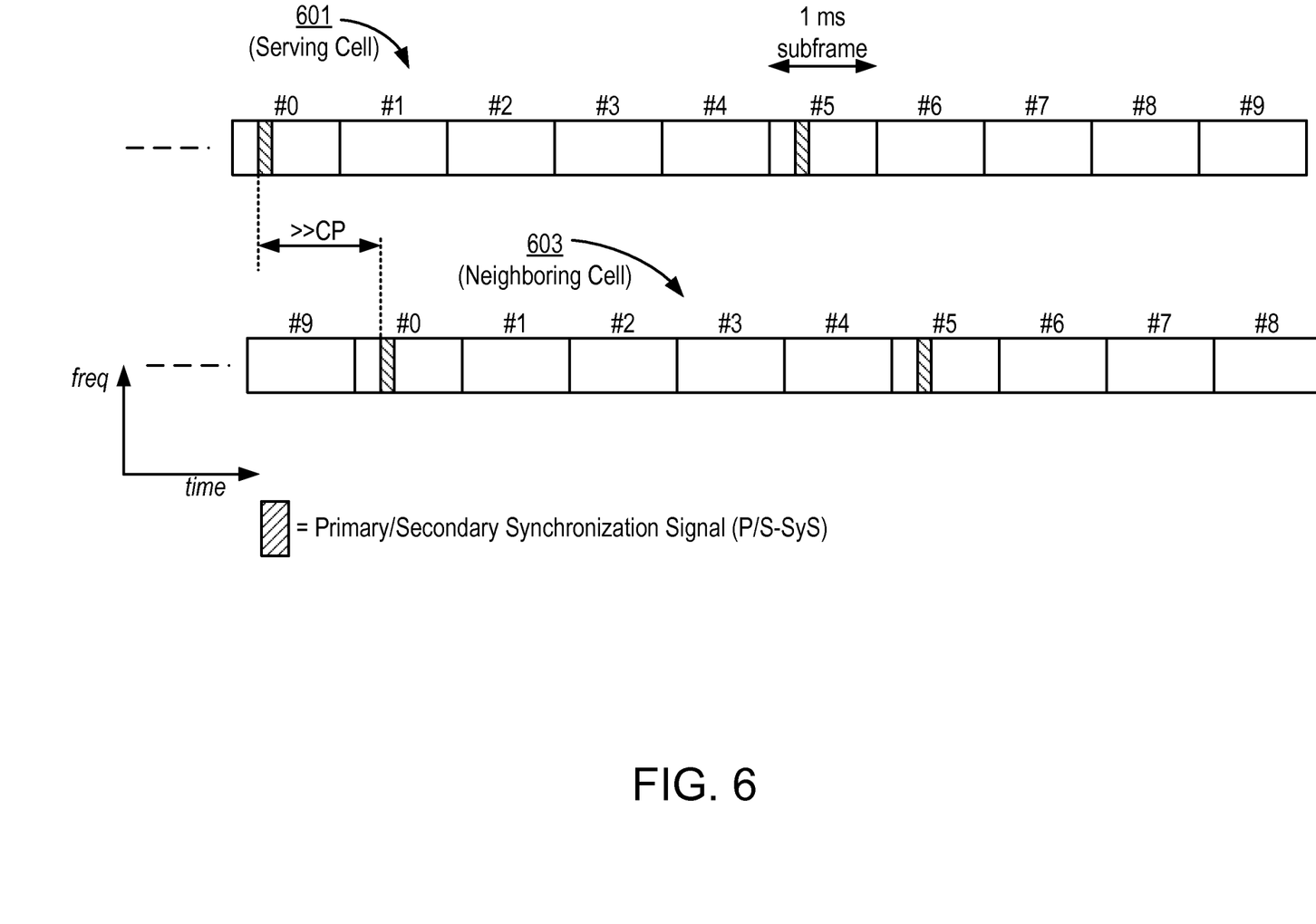
FIG. 6 is a signal timing diagram that illustrates how an air interface can appear to a UE in an asynchronous network.

FIG. 6 is a signal timing diagram that illustrates how an air interface can appear to a UE in an asynchronous network. The UE receives a serving cell's radio frame 601. In this example, the UE additionally receives a neighboring cell's radio frame 603. Because the network is asynchronous, the timing of the signals from the serving cell and the neighboring cell are not coordinated with one another, and will therefore have an unpredictable relationship. The UE can determine the timing relationship by comparing the time of occurrence of periodically occurring signals within each of the radio frames. For example, in an LTE system, the synchronization signals, P-SyS or S-SyS ("P/S-SyS") can be used for this purpose. In this example, the occurrence of the neighboring cell's radio frame 603 is delayed, relative to that of the serving cell's radio frame 601, by an amount that exceeds the length of a cyclic prefix.

Figure 7:
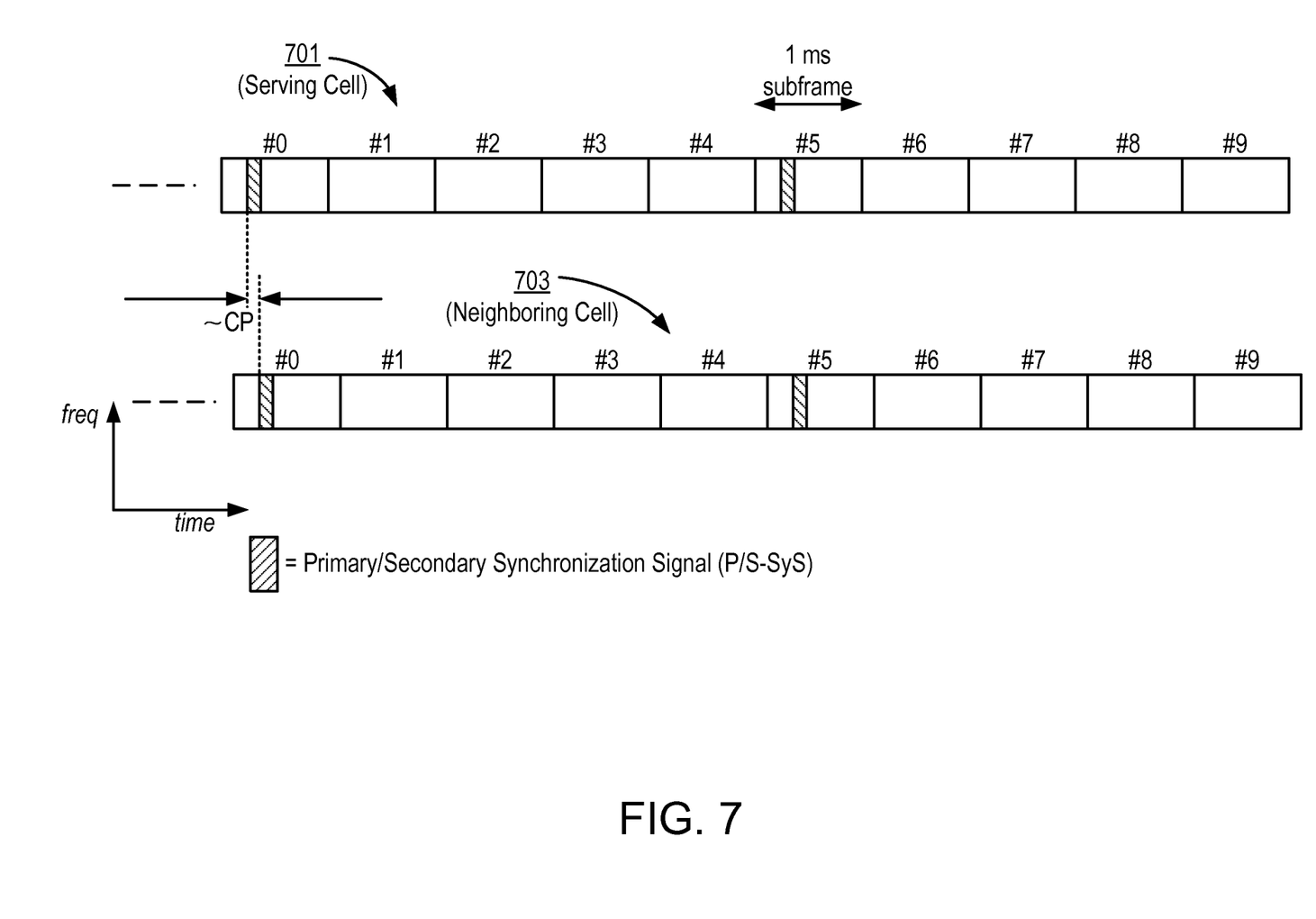
FIG. 7 is a signal timing diagram that illustrates how an air interface can appear to a UE in a synchronized network.

By comparison, FIG. 7 is a signal timing diagram that illustrates how an air interface can appear to a UE in a synchronized network. The UE receives a serving cell's radio frame 701. In this example, the UE additionally receives a neighboring cell's radio frame 703. Because the network is synchronized, the timing of the signals from the serving cell and the neighboring cell will be coordinated with one another, and will therefore have similar timings. As with the asynchronous case, the UE can determine the timing relationship by comparing the time of occurrence of periodically occurring signals within each of the radio frames. For example, in an LTE system, the synchronization signals, P-SyS or S-SyS ("P/S-SyS") can be used for this purpose. In this example, the occurrence of the neighboring cell's synchronized radio frame 703 is delayed, relative to that of the serving cell's radio frame 601, by only a small amount (e.g., no more than the duration of the cyclic prefix). The reason for any delay at all is due to the larger distance (and hence larger propagation delay) between the UE and the neighboring cell than exists between the UE and its serving cell.

In an aspect of embodiments consistent with the invention, the above-described properties can be exploited by a UE to ascertain whether the network in which it is operating is synchronized or asynchronous. In another aspect, the UE can use this information to optimize its performance.

Figure 8:
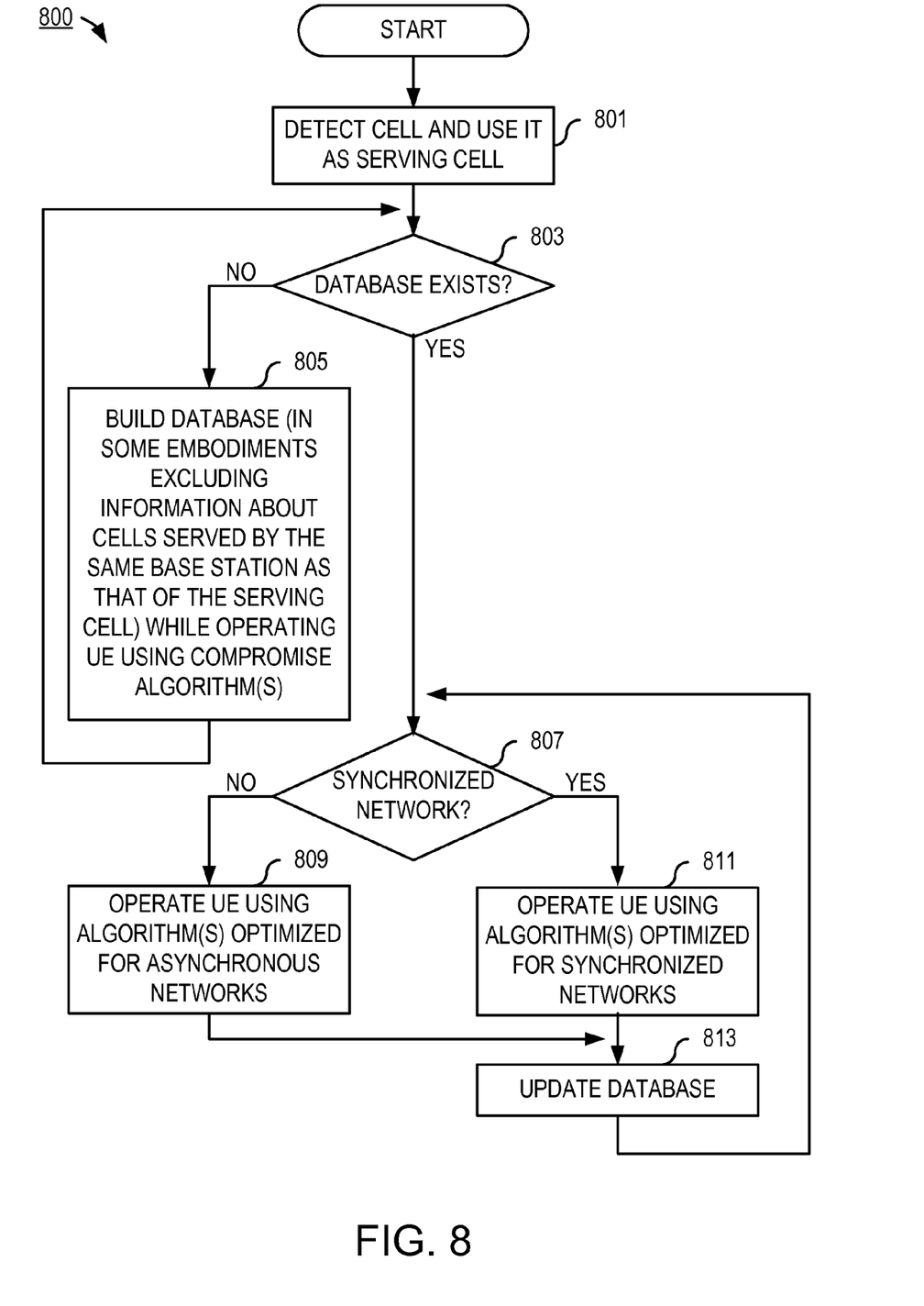
FIG. 8 is, in one respect, a flowchart of exemplary steps/processes performed in a UE in accordance with aspects of the invention.

FIG. 8 is, in one respect, a flowchart of exemplary steps/processes performed in a UE in accordance with aspects of the invention. FIG. 8 can, in another respect, be considered to depict a UE 800 having logic configured to perform the variously described functions. Only those functions that are relevant to the invention are depicted. Those skilled in the art will recognize that the UE 800 will additionally need to perform many other functions, whose descriptions are beyond the scope of the invention.

Initially (e.g., upon startup), the UE 800 detects a cell and performs operations to make the detected cell its serving cell (step 801). This includes the UE 800 synchronizing its operations with those of the serving cell.

In an aspect of embodiments consistent with the invention, the UE will build and then utilize a locally-stored database of information from which it will ascertain whether the communication network is a synchronized or asynchronous one. Accordingly, part of the UE's operation comprises detecting whether this database already exists (decision block 803). If not ("NO" path out of decision block 803), the UE 800, as part of its regular mobility management, performs measurements on signals received from neighboring cells (step 805). A purpose of these measurements is to build up a database about these neighboring cells and to report their signal strength and other important information to the serving base station to assist with handover decisions. Of relevance to the invention is that, in addition, the UE 800 collects and stores (in the same or a separate database) timing information about the neighboring cell's signals (e.g., information about when a P/S-synch signal and/or other reference signal occurred, either in an absolute sense or relative to the counterpart P/S-synch signal of the serving cell). In some embodiments, it is also convenient to additionally store the timing information about the UE's serving cell in this database. As will be seen shortly, the timing information collected in this manner will be used for later comparison with the serving cell's timing signals to ascertain whether the network is synchronized or asynchronous.

So long as the UE 800 does not know the state of the network (i.e., synchronized or asynchronous), it uses "compromise" or default algorithms that, although not optimized, are usable in either type of network.

After the database has reached a predetermined size, the database is considered to exist ("YES" path out of decision block 803). The UE 800 then ascertains whether the network is synchronized or asynchronous (decision block 807). This is accomplished by comparing the different timings (stored in the database) and from these comparisons reaching a conclusion about the synchronization state of the network. That is, if comparable signals from the serving and neighboring cell(s) occurred within a predefined time span of one another, the network is considered to be synchronized; otherwise it is considered to be asynchronous. An exemplary time span within which two cells are considered to be synchronized is the duration of the cyclic prefix or a fraction thereof.

It will be observed that two cells can be asynchronous and yet, due to chance alone, appear to be synchronized due to close proximity between their corresponding periodically occurring signal(s). To avoid reaching such erroneous conclusions, a UE can compare the signals from a sufficient number of neighboring cells to substantially reduce the possibility of the signals all being approximately coincident purely by chance.

In some, but not necessarily all, embodiments, more detailed information about the detected neighboring cells (e.g., the cell ID) also contributes to the decision. This is because, in a common deployment scenario, three cells are served by a single base station and this results in their timing being synchronized with one another. However, the fact that these three cells are synchronized does not provide any information about the synchronization state of the surrounding network. In an LTE system, for example, the synchronization signal comprises a Primary Synchronization Signal (P-SyS) and a Secondary Synchronization Signal, as described earlier. Three cells served by the same base station typically use different P-SyS signals, but they use the same S-SyS. To avoid making wrong decisions that can result from this "deployment rule", in some embodiments of the invention cells served by the same base station are excluded from the calculation of the synchronization state of the network.

In another aspect of embodiments consistent with the invention, after the terminal has determined the synchronization state of the network it can use this knowledge in subsequent operation. Since a synchronized network typically extends over a wider geographical region than can be detected by the UE 800 from only one location, the decision derived from the previously measured cells is now and later applied to improve performance.

Accordingly, if the UE 800 has ascertained that it is operating in an asynchronous network ("NO" path out of decision block 807), it employs one or more algorithms that are optimized for use in such a network (step 809). By comparison, if the UE 800 has ascertained that it is operating in a synchronized network ("YES" path out of decision block 807), it instead employs one or more algorithms that are optimized for use in a synchronized network (step 811).

In either case (i.e., synchronized or asynchronous network), the UE can continue maintaining and building up its database (step 813) so that it will be able to detect a change in the synchronization state, for example due to the UE 800 entering or leaving a synchronized network region.

FIG. 8 depicts the situation in which the UE 800 first detects a serving cell, and then uses compromise or default algorithms until it has sufficiently built up the database from which it can ascertain whether the network is synchronized or asynchronous. However, in another aspect of embodiments consistent with the invention, the UE 800 need not use compromise or default algorithms if it can reliably use a decision that had been made, for example, before being switched off. For later power on events, even the initial cell search procedure can be improved by assuming the same synchronization status of the network as existed when the UE 800 was last switched off. The age of the earlier-made decision can be used as an indicator of reliability. An old decision can be unreliable because, for example, the UE 800 may have roamed away from the earlier-detected network. Another indicator of reliability is carrier frequency information: If the UE 800 begins a cell search on a same carrier, $f_c$, from which the UE 800 had previously recognized the network as being either synchronized or asynchronous the last time the UE 800 had been switched on, the earlier decision can be considered reliable and used at startup. Yet another indicator of reliability is geographical location information: If, upon power on, the UE 800 determines that it is within a close-enough proximity to a geographical location at which the UE 800 had last been switched off, the earlier decision regarding the network's synchronization status can be used again. Such geographical location information can be obtained, for example, from Global Positioning System (GPS) circuitry included within the UE 800. It will be appreciated that any of these types of historical information can be used either alone or in any combination to decide whether an earlier network synchronization status decision is reliable-enough to be used upon startup of the UE 800.

Figure 9:
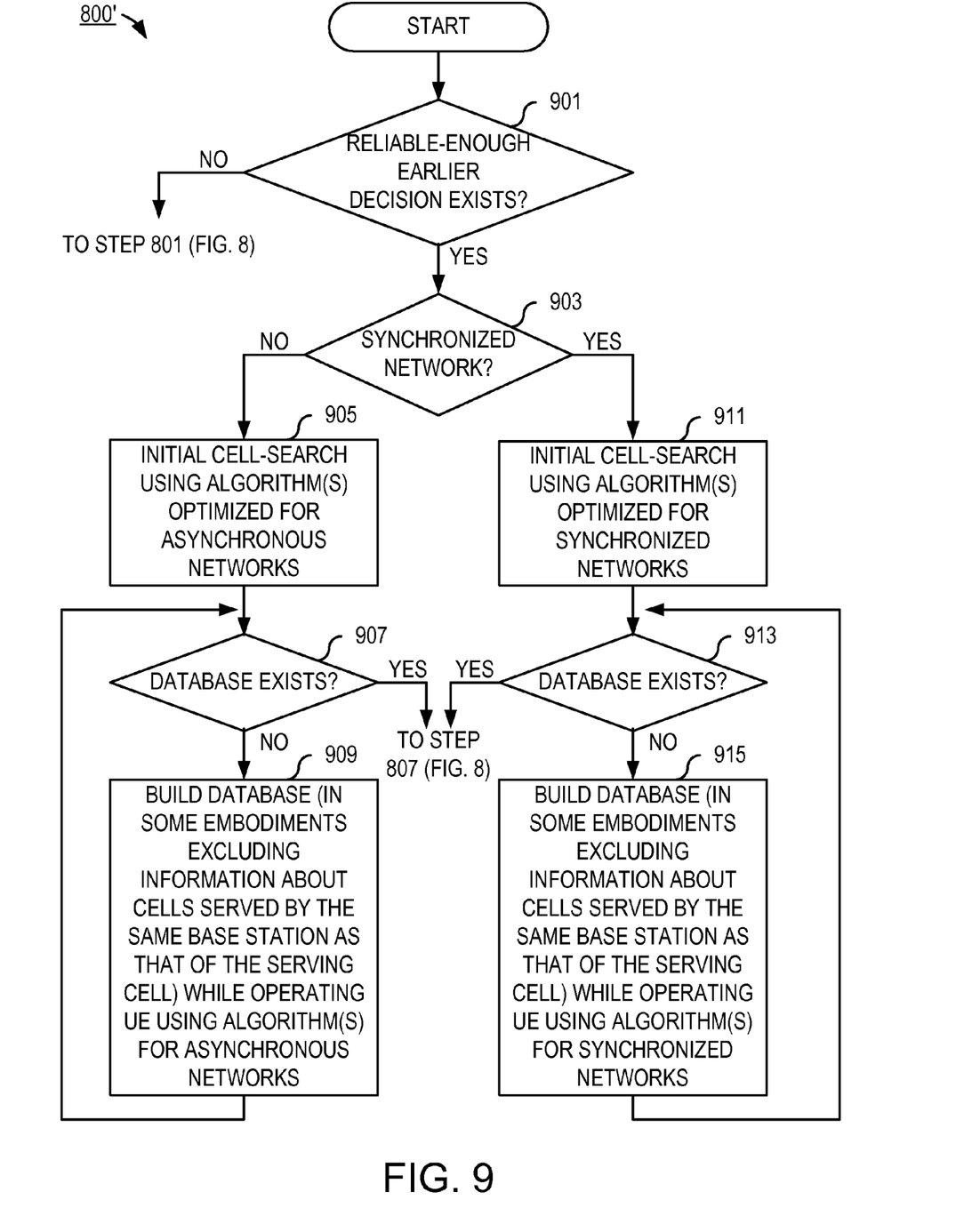
FIG. 9 is, in one respect, a flowchart of exemplary steps/processes performed in a UE in accordance with these aspects of the invention.

FIG. 9 is, in one respect, a flowchart of exemplary steps/processes performed in a UE in accordance with these aspects of the invention. FIG. 9 can, in another respect, be considered to depict a UE 800' having logic configured to perform the variously described functions. Upon, for example, power on, the UE 800' tests an earlier-saved status indicator to ascertain whether it had previously made a decision regarding the synchronization state of the network, and if so, whether that decision is reliable-enough to be used (decision block 901). Reliability can be assessed by any of a number of factors, including but not limited to age of the decision, carrier frequency information, and geographical location information. The age of the decision can be determined by any of a number of different ways. For example, a running timer that was started when the UE 800' was last switched off can be used. Alternatively, the UE 800' can store a timestamp in memory that records when the UE 800' was last switched off. That timestamp can then be compared with a present-value of a UE clock to determine the age.

If there was no earlier network synchronization status decision, or if an earlier-made decision cannot be considered reliable ("NO" path out of decision block 901), then the UE 800' operates as earlier described with reference to FIG. 8, beginning at step 801.

However, if there is a useable earlier decision ("YES" path out of decision block 901), then that decision is used to direct further processing. Specifically, if it had been decided that the network was not synchronized ("NO" path out of decision block 903), then an initial cell-search algorithm is run that is optimized for asynchronous networks (step 905). Once the initial cell-search identifies a cell that is to be the serving cell, the existence of the database is tested (decision block 907). If the database does not yet exist ("NO" path out of decision block 907), the UE 800' collects and stores timing information about the neighboring cell's signals (e.g., information about when a P/S-synch signal and/or other reference signal occurred, either in an absolute sense or relative to the counterpart P/S-synch signal of the serving cell) (step 909). The algorithm(s) used for this purpose are optimized for use with asynchronous networks. Timing information about the UE's own serving cell can, in some embodiments, also be stored in this database.

After the database has reached a predetermined size, the database is considered to exist ("YES" path out of decision block 907). The UE 800' then proceeds to decision block 807 (see FIG. 8), where it operates as described earlier. This operation will depend on whether the most recent database indicates that the network is synchronized or asynchronous.

Referring back to decision block 903, if it had been decided that the network was synchronized ("YES" path out of decision block 903), then an initial cell-search algorithm is run that is optimized for synchronized networks (step 911). Once the initial cell-search identifies a cell that is to be the serving cell, the existence of the database is tested (decision block 913). If the database does not yet exist ("NO" path out of decision block 913), the UE 800' collects and stores timing information about the neighboring cell's signals (e.g., information about when a P/S-synch signal and/or other reference signal occurred, either in an absolute sense or relative to the counterpart P/S-synch signal of the serving cell) (step 915). The algorithm(s) used for this purpose are optimized for use with synchronized networks. Timing information about the UE' s own serving cell can, in some embodiments, also be stored in this database.

After the database has reached a predetermined size, the database is considered to exist ("YES" path out of decision block 913). The UE 800' then proceeds to decision block 807 (see FIG. 8), where it operates as described earlier. This operation will depend on whether the most recent database indicates that the network is synchronized or asynchronous.

In yet another aspect of embodiments consistent with the invention, different databases can be created and stored for different networks and frequency bands.

As discussed above, the knowledge of whether a network is synchronized or asynchronous can be used to improve the performance of the UE. Examples of algorithms that can be optimized in this way include, but are not limited to, cell search and channel estimation procedures. For example, in the case of cell search, knowledge that a network is synchronized can be used to include a search for so-called "hidden cells"—these are neighboring cells whose signals are synchronized with those of the serving cell, but whose signals are effectively "hidden" by the stronger signals received from the serving cell. (The difference in signal strength is due to the UE's closer proximity to the serving cell than to the neighboring cell). Furthermore, the P-SyS of a synchronized neighboring cell can be masked by the time-aligned P-SyS of the serving cell and may have the same P-SyS. Accordingly, when the network is synchronized, detections of the neighboring cell will be done from stage 2 of the cell search procedure (i.e., relying on the S-SyS) in combination with cell ID verification using reference symbols, that occurs in stage 3. Particular algorithms for cell search are beyond the scope of the invention, and therefore need not be described here in great detail.

In another example, channel estimation can be optimized based on the synchronization state of the network. That is, knowledge of the synchronization state of the network can control whether signals from other cells can be treated as noise (asynchronous networks) or whether the combination of signals work together and become a multi-cell transfer function (synchronized networks).

The invention has been described with reference to particular embodiments. However, it will be readily apparent to those skilled in the art that it is possible to embody the invention in specific forms other than those of the embodiment described above. The described embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of operating a user equipment in a mobile communications system that includes a serving cell and a neighboring cell that both use a same radio access technology, wherein a network part of the mobile communications system is capable of operating in a synchronized mode or in an asynchronous mode, the method comprising:

recording timing information about a periodically occurring signal received from the neighboring cell;

using the recorded timing information in a blind detection process that ascertains whether the network part of the mobile communications system is operating in the synchronized mode or in the asynchronous mode by determining that the network part of the mobile communication system is operating in the synchronized mode by at least detecting that the periodically occurring signal received from the neighboring cell occurred within a predetermined window of time of a corresponding periodically occurring signal received from the serving cell, and by determining that the network part of the mobile communication system is operating in the asynchronous mode by at least detecting that the periodically occurring signal received from the neighboring cell occurs at an interval greater than the predetermined window of time of the corresponding periodically occurring signal received from the serving cell, wherein the blind detection process is a process that does not rely on information encoded in the periodically occurring signal received from the neighboring cell, wherein the information represents whether the network part of the mobile communications system is operating in the synchronized mode or in the asynchronous mode; and using the detected operating mode of the network part of the mobile communications system for controlling subsequent operation of the user equipment.

2. The method of claim 1, wherein using the detected operating mode of the network part of the mobile communications system for controlling subsequent operation of the user equipment comprises:
  performing a function using a first process if the detected operating mode of the network part of the mobile communications system is the synchronized mode, wherein the first process is optimized for use in a mobile communication system that is operating in the synchronized mode; and
  performing the function using a second process if the detected operating mode of the network part of the mobile communications system is the asynchronous mode, wherein the second process is optimized for use in a mobile communication system that is operating in the asynchronous mode.

3. The method of claim 2, wherein the function is a cell search function.

4. The method of claim 2, wherein the function is a channel estimation function.

5. The method of claim 1, comprising:
  performing an initial cell search function that is optimized for use in a mobile communication system that is operating in the synchronized mode if an earlier network synchronization status decision indicates that the user equipment had earlier been operating in a mobile communication system that was operating in the synchronized mode; and
  performing an initial cell search function that is optimized for use in a mobile communication system that is operating in the asynchronous mode if the earlier network synchronization status decision indicates that the user equipment had earlier been operating in a mobile communication system that was operating in the asynchronous mode.

6. The method of claim 5, comprising:
  initially determining whether the earlier network synchronization status decision is reliable enough to be used.

7. The method of claim 1, comprising:
  preventing the blind detection process that ascertains whether the network part of the mobile communications system is operating in the synchronized mode or in the asynchronous mode from relying on timing information about a periodically occurring signal received from a neighboring cell that is served by a base station that also serves the serving cell.

8. The method of claim 7, comprising:
  detecting whether the neighboring cell is served by a base station that also serves the serving cell by comparing a cell identifier of the neighboring cell with a cell identifier of the serving cell.

9. An apparatus that operates in a user equipment in a mobile communications system that includes a serving cell and a neighboring cell that both use a same radio access technology, wherein a network part of the mobile communications system is capable of operating in a synchronized mode or in an asynchronous mode, the apparatus comprising:
  logic circuitry configured to record timing information about a periodically occurring signal received from the neighboring cell;
  logic circuitry configured to use the recorded timing information in a blind detection process that ascertains whether the network part of the mobile communications system is operating in the synchronized mode or in the asynchronous mode
    by determining that the network part of the mobile communication system is operating in the synchronized mode by at least detecting that the periodically occurring signal received from the neighboring cell occurred within a predetermined window of time of a corresponding periodically occurring signal received from the serving cell, and
    by determining that the network part of the mobile communication system is operating in the asynchronous mode by at least detecting that the periodically occurring signal received from the neighboring cell occurs at an interval greater than the predetermined window of time of the corresponding periodically occurring signal received from the serving cell,
    wherein the blind detection process is a process that does not rely on information encoded in the periodically occurring signal received from the neighboring cell, wherein the information represents whether the network part of the mobile communications system is operating in the synchronized mode or in the asynchronous mode; and
  logic circuitry configured to use the detected operating mode of the network part of the mobile communications system for controlling subsequent operation of the user equipment.

10. The apparatus of claim 9, wherein the logic circuitry configured to use the detected operating mode of the network part of the mobile communications system for controlling subsequent operation of the user equipment comprises:
  logic circuitry configured to perform a function using a first process if the detected operating mode of the network part of the mobile communications system is the synchronized mode, wherein the first process is optimized for use in a mobile communication system that is operating in the synchronized mode; and
  logic circuitry configured to perform the function using a second process if the detected operating mode of the network part of the mobile communications system is the asynchronous mode, wherein the second process is optimized for use in a mobile communication system that is operating in the asynchronous mode.

11. The apparatus of claim 10, wherein the function is a cell search function.

12. The apparatus of claim 10, wherein the function is a channel estimation function.

13. The apparatus of claim 9, comprising:
  logic circuitry configured to perform an initial cell search function that is optimized for use in a mobile communication system that is operating in the synchronized mode if an earlier network synchronization status decision indicates that the user equipment had earlier been operating in a mobile communication system that was operating in the synchronized mode; and
  logic circuitry configured to perform an initial cell search function that is optimized for use in a mobile communication system that is operating in the asynchronous mode if the earlier network synchronization status decision indicates that the user equipment had earlier been operating in a mobile communication system that was operating in the asynchronous mode.

14. The apparatus of claim 13, comprising:
  logic circuitry configured to initially determine whether the earlier network synchronization status decision is reliable enough to be used.

15. The apparatus of claim 9, comprising:
  logic circuitry configured to prevent the blind detection process that ascertains whether the network part of the mobile communications system is operating in the synchronized mode or in the asynchronous mode from relying on timing information about a periodically occurring signal received from a neighboring cell that is served by a base station that also serves the serving cell.

16. The apparatus of claim 15, comprising:
logic circuitry configured to detect whether the neighboring cell is served by a base station that also serves the serving cell by comparing a cell identifier of the neighboring cell with a cell identifier of the serving cell.

* * * * *